(12) United States Patent
Kossel et al.

(10) Patent No.: US 9,009,520 B2
(45) Date of Patent: Apr. 14, 2015

(54) CLOSED-LOOP MULTIPHASE SLEW RATE CONTROLLER FOR SIGNAL DRIVE IN A COMPUTER SYSTEM

(75) Inventors: Marcel A. Kossel, Ruesclikon (CH); Daihyun Lim, Hopewell Junction, NY (US); Pradeep Thiagarajan, Essex Junction, VT (US)

(73) Assignee: International Business Machines Corporation, Armonk, NY (US)

(*) Notice: Subject to any disclaimer, the term of this patent is extended or adjusted under 35 U.S.C. 154(b) by 823 days.

(21) Appl. No.: 13/219,816

(22) Filed: Aug. 29, 2011

(65) Prior Publication Data

US 2013/0055006 A1 Feb. 28, 2013

(51) Int. Cl.
*G06F 1/04* (2006.01)
*G06F 1/24* (2006.01)
*G06F 11/00* (2006.01)

(52) U.S. Cl.
CPC .......................................... *G06F 1/04* (2013.01)

(58) Field of Classification Search
CPC ........................................................ G06F 1/04
USPC .......................................................... 713/503
See application file for complete search history.

(56) References Cited

U.S. PATENT DOCUMENTS

| 7,109,768 | B2 | 9/2006 | Rashid | |
|---|---|---|---|---|
| 7,539,802 | B2* | 5/2009 | Horowitz et al. | 710/104 |
| 7,663,418 | B2* | 2/2010 | Dale et al. | 327/170 |
| 7,688,929 | B2* | 3/2010 | Co | 375/376 |
| 7,755,413 | B2 | 7/2010 | Wong | |
| 8,004,330 | B1* | 8/2011 | Acimovic et al. | 327/170 |
| 2002/0158674 | A1* | 10/2002 | Ang et al. | 327/108 |
| 2003/0187599 | A1 | 10/2003 | Yoo et al. | |
| 2005/0127947 | A1* | 6/2005 | Arnold et al. | 326/93 |
| 2007/0140399 | A1* | 6/2007 | Kossel et al. | 375/376 |
| 2008/0054969 | A2* | 3/2008 | Fiedler | 327/170 |
| 2012/0151247 | A1* | 6/2012 | Ferraiolo et al. | 714/4.5 |

* cited by examiner

*Primary Examiner* — Mohammed Rehman
(74) *Attorney, Agent, or Firm* — Cantor Colburn LLP; Daniel Morris

(57) ABSTRACT

A slew rate controller for a computing system includes a slew rate control module, the slew rate control module further comprising a plurality of sampling modules, each sampling module corresponding to one of a plurality of phase signal inputs, wherein each sampling module receives an input signal, a reference voltage, and the sampling module's respective phase signal input, and wherein each sampling module generates a respective sample of a relationship between the input signal and the reference voltage during a time period indicated by the sampling module's respective phase signal input; and a finite state machine configured to output a slew rate control signal to control a slew rate of the input signal based on the plurality of samples from the sampling modules.

18 Claims, 7 Drawing Sheets

CLOSED-LOOP MULTIPHASE SLEW RATE CONTROLLER FOR SIGNAL DRIVE IN A COMPUTER SYSTEM

BACKGROUND

This disclosure relates generally to the field of computing systems, and more particularly to slew rate control in a computing system.

Electrical devices such as processors, memory controllers, and graphics controllers are part of many computer and electronic systems. A typical electrical system has drivers to drive signals from one device to another device. Drivers are often designed to drive signals with a specific slew rate (i.e., edge steepness), which is the rate at which the signal switches between different signal levels within a specified time. A relatively high slew rate may introduce undesirable noise into a signal, while a relatively low slew rate may lengthen the time needed for the signal to switch between the signal levels, limiting the operating frequency of the system.

Phase rotators are computing system components that are designed to output a signal having a specified frequency and slew rate. The signal output by a phase rotator may be used to, for example, adjust the optimum sampling point in time and clock skew adjustments that are required for the burst mode data transmission. A computer system may include many phase rotators. A phase rotator may include three stages: a phase selector stage that selects two input phases from a plurality of input phases provided by a multiphase generator; a edge slewing stage that adjusts the slew rate of the two selected input phases from the phase selector stage, and a phase blending stage to interpolate between two slew rate adjusted input phases from the edge slewing stage to generate the phase rotator output signal with the desired phase and frequency. The phase rotator selects, adjusts, and interpolates between one of the even input phases and one of the adjacent odd phases from the plurality of input phases provided by the multiphase generator to generate the phase rotator output signal.

The edge slewing stage determines the performance of the phase rotator with respect to its phase linearity, which is measured in differential non-linearity (DNL) and integral non-linearity (INL). If the edges of the two interpolated phase signals are too steep (i.e., the slew rate is too high), there will be relatively high DNL values. If the edges of the interpolated phase signals are too flat (i.e., the slew rate is too low), the phase interpolation may cause poor INL, significant duty cycle distortion or even failure. It is therefore important to adjust the slew rate of the rising and falling edges to be identical, and to adjust the absolute value of the slew rate optimally such that the phase interpolation can be operated with minimum DNL and INL values. If timing jitter is neglected, the slew rate may be adjusted by the edge slewing stage such that the signals output by the edge slewing stage just hit the voltage rails, so that the signals output by the edge slewing stage allow the phase blending stage to operate relatively linearly. A safety margin might be added to the slew rate adjustment to prevent the signals from not hitting the voltage rails because of timing jitter. However, supply noise jitter may contribute to amplitude fluctuations in the phase rotator output signal.

BRIEF SUMMARY

In one aspect, a slew rate controller for a computing system includes a slew rate control module, the slew rate control module further comprising a plurality of sampling modules, each sampling module corresponding to one of a plurality of phase signal inputs, wherein each sampling module receives an input signal, a reference voltage, and the sampling module's respective phase signal input, and wherein each sampling module generates a respective sample of a relationship between the input signal and the reference voltage during a time period indicated by the sampling module's respective phase signal input; and a finite state machine configured to output a slew rate control signal to control a slew rate of the input signal based on the plurality of samples from the sampling modules.

In another aspect, a method for slew rate control in a computing system includes receiving, by a slew rate control module, an input signal, a reference voltage, and a plurality of phase signal inputs, wherein the slew rate control module comprises a plurality of sampling modules, each sampling module corresponding to a phase signal input of the plurality of phase signal inputs, wherein each sampling module receives the input signal, the reference voltage, and the sampling module's respective phase signal input; generating, by each of the plurality of sampling modules, a sample of a relationship between the input signal and the reference voltage during a time period indicated by the sampling module's respective phase signal input; and outputting, by a finite state machine of the slew rate control module, a slew rate control signal to control a slew rate of the input signal based on the plurality of samples from the sampling modules.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
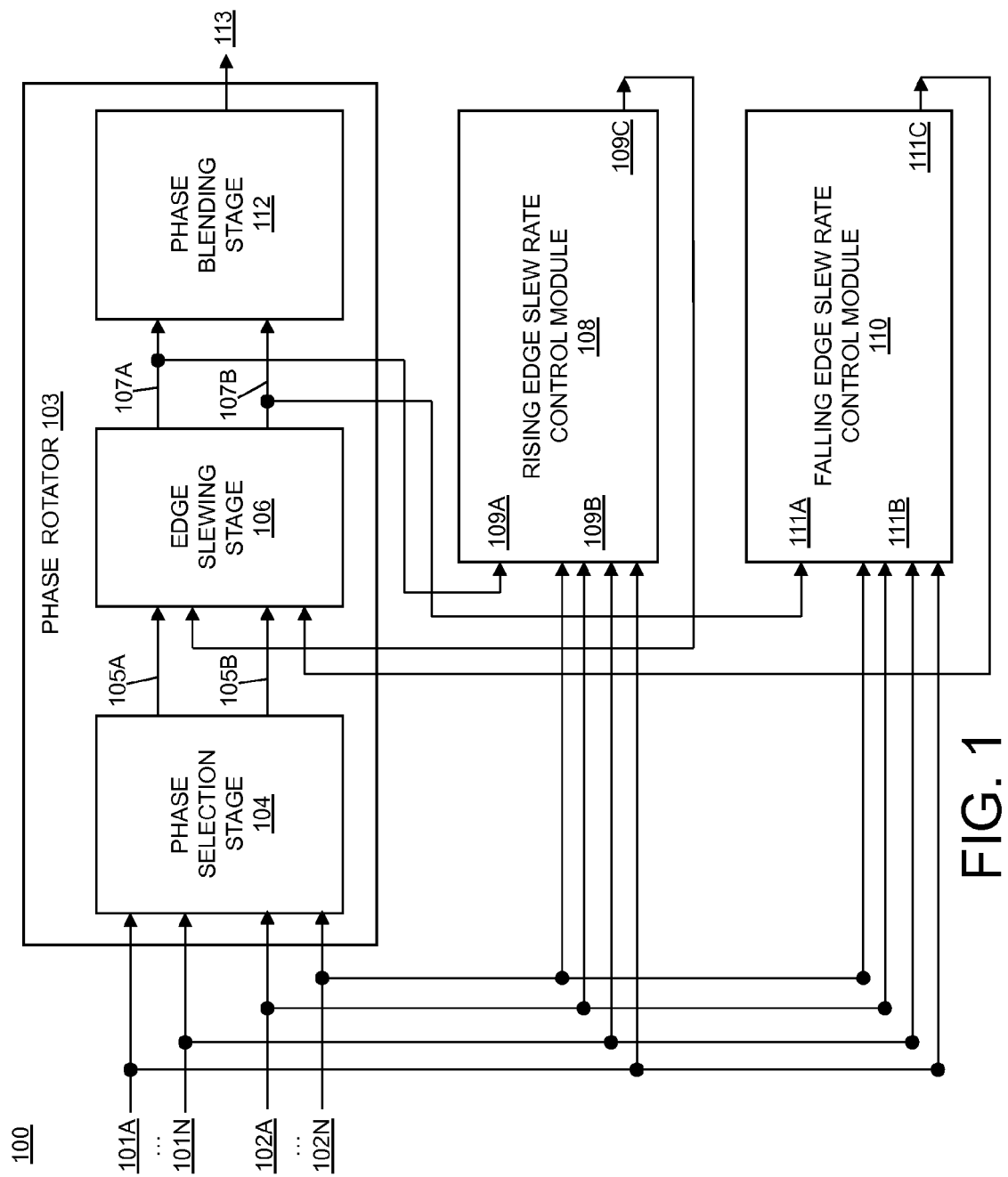
FIG. 1 is a schematic block diagram illustrating an embodiment of a phase rotator and a closed-loop multiphase slew rate controller.

Embodiments of a closed-loop multiphase slew rate controller, and a method of operating a closed-loop multiphase slew rate controller, are provided, with exemplary embodiments being discussed below in detail. The closed-loop multiphase slew rate controller operates based on a digital time-domain measurement of the slew rate adjusted signals output by the edge slewing stage, with a closed-loop feedback loop to quickly and accurately adjust the operation of the edge slewing stage to a target slew rate based on the digital measurement. The closed-loop multiphase slew rate controller uses the plurality of input phases that are provided by the multiphase generator to the phase rotator as inputs, and may include a rising edge slew rate control module and a falling edge slew rate control module in some embodiments.

The closed-loop multiphase slew rate controller receives a slew rate adjusted signal that is output by the edge slewing stage of the phase rotator and feed the slew rate adjusted signal as an input signal to a slew rate control module, which may be a rising or falling edge slew rate control module that includes a bank of sense amplifier latches, each latch corresponding to a single phase signal from the multiphase generator. Each latch samples the input signal based on its respective phase. Because each of the multiphase input clock signals has a different time shift, a vector of samples of the input signal is generated by the latches that gives information about how long the input signal stays at the high and low power supply rails, which is an indirect measure of the slew rate associated with the rising and falling edges. The sampling vector is a set of 1s and 0s. A finite state machine (FSM) in the slew rate control module counts the number of 0s and 1s in the sampling vector and uses a lookup table to evaluate the sampling vector. A slew rate control signal based on the evaluation is then generated by the FSM and output to the edge slewing stage in the phase rotator.

The closed-loop multiphase slew rate controller is scalable to high data rates due to the multiphase sampling, and robust since it operates in the digital domain. The multiphase sampling may be performed using multiphase signals that are already present in the computing system as phase rotator inputs. The slew rate control modules may be reconfigured for different slew rate definitions by changing the table entries in the look-up table that is included in each slew rate control module, and/or by changing the reference voltage level. The closed-loop multiphase slew rate controller may be a low-power and small-area device that performs fast, automatic adjustment of the slew rate that is output by the edge slewing stage of a phase rotator. The slew rate control signal from a single closed-loop multiphase slew rate controller may also control a plurality of phase rotators in the computing system that operate under similar voltage and temperature conditions, in addition to similar multiphase input frequency and phase separation characteristics, as the phase rotator in the computing system from which the closed-loop multiphase slew rate controller receives its input signals.

The timing resolution of the closed-loop multiphase slew rate controller is limited by the number of available multiphase input signals from the multiphase generator, and the granularity of the slew adjustment of the adjusted signals output by the edge slewing stage is finer as more multiphase inputs with different phases are available within the system. The edge slewing stage of the phase rotator may be any appropriate implementation of an edge slewing stage, including current-starved or binary/thermometer weighted inverters, that perform slew rate adjustment of selected input phases from the phase selection stage. The closed-loop multiphase slew rate controller causes the edge slewing stage to slew the edges of the phase signals received by the edge slewing stage from the phase selector so that the phase interpolation performed by the phase blending stage will be relatively linear. In addition to phase rotators, a closed-loop multiphase slew rate controller may be used to control the slew rate for other applications in which a multiphase signal for sampling is available, such as line drivers where slew rate control is used for cross-talk reduction.

FIG. 1 shows a system 100 including a phase rotator and a closed-loop multiphase slew rate controller that includes rising edge and falling edge slew rate control modules. The phase rotator 103 includes a phase selection stage 104, an edge slewing stage 106, and a phase blending stage 112. The phase selection stage 104 receives even phases 101A-N and odd phases 102A-N from a multiphase generator (not shown) with monotonically increasing phases and equidistant phase shifts, which may be, for example, a multiphase voltage-controlled oscillator (VCO) of a phase-locked-loop (PLL) circuit, or delay line of a delay-locked-loop (DLL) circuit. The number N of odd and even phases may be any appropriate number. The phase selection stage 104 performs N:1 multiplexing of the even phases 101A-N, and of the odd phases 102A-N, and outputs two adjacent phase signals 105A-B of the multiphase inputs to the edge slewing stage 106. The edge slewing stage 106 adjusts the slew rates of the two selected signals 105A-B, outputting even adjusted signal 107A and odd adjusted signal 107B. Adjusted signals 107A-B are received by phase blending state 112, which interpolates between adjusted signals 107A-B to produce the phase rotator output signal 113.

The edge slewing stage 106 may include any appropriate type of slew rate adjustment circuitry that may be implemented in a phase rotator, for example, current-starved inverters or weighted sets of regular inverters. Current-starving allows the phase rotator 103 to be designed for maximum tuning range whereas weighted inverters give a more linear tuning range. The edge slewing stage 106 has a pull-up control vector and a pull-down control vector that are used to adjust the slew rate. If the pull-up control vector is increased (which results in a smaller R and hence in a smaller RC time constant in the edge slewing stage), the rising edge slew rate of adjusted signals 107A-B is increased. If the pull-up control vector is decreased, the rising edge slew rate of adjusted signals 107A-B is decreased because the RC time constant increases with increasing turn-on resistance of the p-type field effect transistor (PFET) branch. If the pull-down control vector is increased, the falling edge slew rate of adjusted signals 107A-B is also increased. If the pull-down control vector is decreased, the falling edge slew rate of adjusted signals 107A-B is also decreased.

Rising edge slew rate control module 108 and falling edge slew rate control module 110 provide closed-loop slew rate control for edge slewing stage 106. Rising edge slew rate control module 108 receives one of adjusted signals 107A-B at input 109A, and each of phases 101A-N and 102A-N at multiphase inputs 109B. These input signals are used to generate a rising edge slew rate control signal at output 109C, which is fed back into edge slewing stage 106 as an input to raise or lower the drive strength (via the pull up control vector) and the rising edge slew rate of the even adjusted signal 107A in the even phase selection path as necessary. Falling edge slew rate control module 110 receives one of adjusted signals 107A-B at input 111A, and each of phases 101A-N and 102A-N at multiphase inputs 111B. These input signals are used to generate a falling edge slew rate control signal at output 111C, which is fed back into edge slewing stage 106 as an input to raise or lower the drive strength (via the pull-down control vector) and the falling edge slew rate of the odd adjusted signal 107B in the odd phase selection path as necessary. In various embodiments, either of adjusted signals 107A-B may be the input signal to either or both of rising edge slew control module 108 and falling edge slew control module 110. Operation of the slew rate control modules 108 and 110 is discussed in further detail with respect to FIG. 2. Slew rate control signals 109C and 111C may also be received by additional edge slewing stages in additional phase rotators in the system 100 that operate under voltage and temperature conditions that are similar to phase rotator 103.

In some embodiments, the closed loop multiphase slew rate controller may include a rising edge and a falling edge slew rate control module as shown in FIG. 1; in other embodiments, the closed loop multiphase slew rate controller may include only one slew rate control module, and the rising and falling edge slew rate are both adjusted based on the output of the single slew rate control module by adjusting the pull-up and pull-down control vectors of the edge slewing stage by the same amount simultaneously. In such an embodiment, the process variations must affect the pull-up (PFET) and the pull-down (n-type FET) branches in the edge slewing stage in the same way. If this is not the case and p/n mismatch occurs, the slew rate measurements must be performed using separate rising edge and falling edge slew rate control modules.

Figure 2:
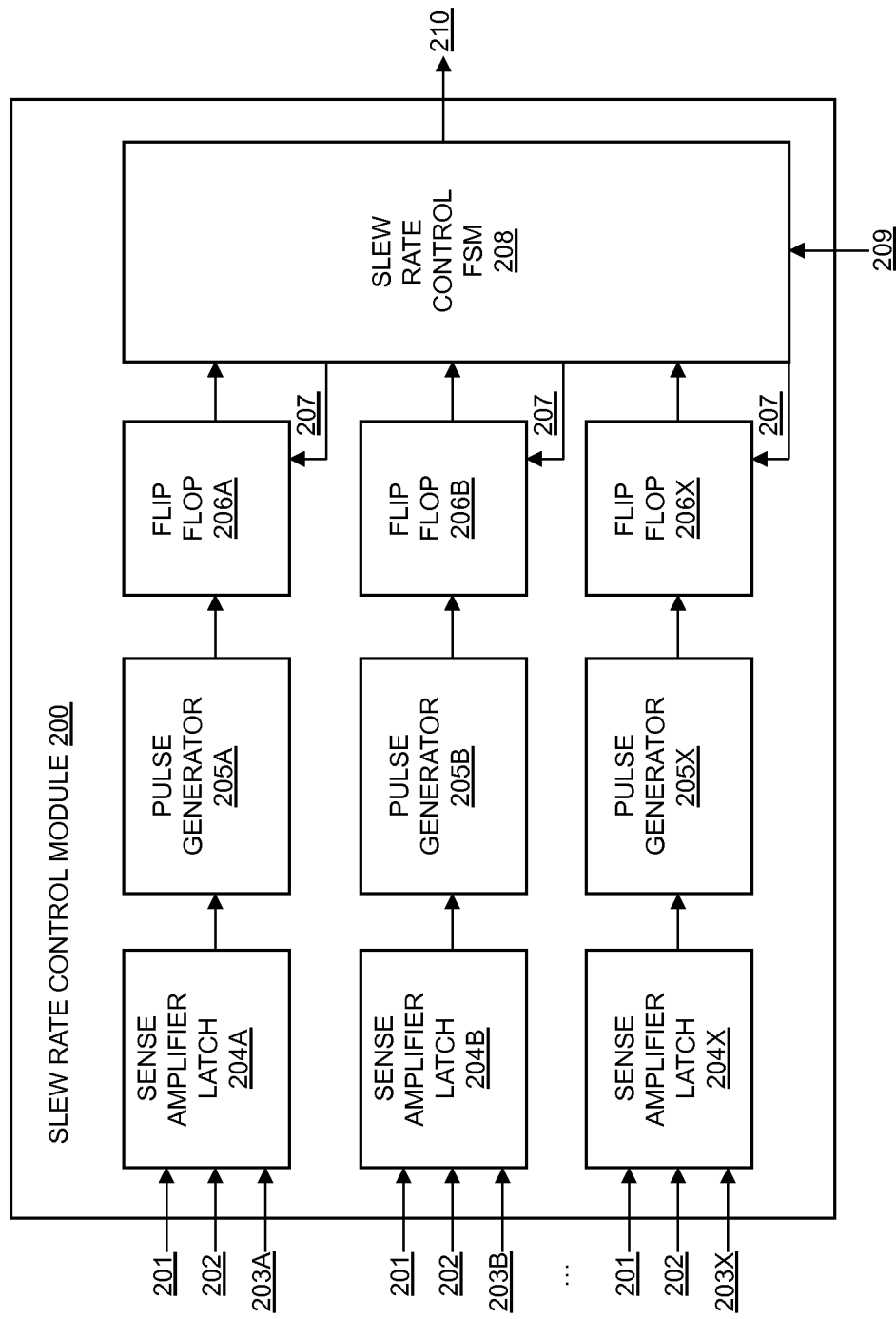
FIG. 2 is a schematic block diagram illustrating an embodiment of a slew rate control module.

FIG. 2 shows a detailed view of an embodiment of a slew rate control module 200. Each of rising edge slew rate control module 108 and falling edge slew rate control module 110 of FIG. 1 may comprise the slew rate control module 200 shown in FIG. 2. In rising edge slew rate control module 108, the input signal 201 is one of adjusted signals 107A-B of FIG. 1. Reference voltage 202 is the high power rail voltage, which may be 90% of the supply rail of the system 100 in some embodiments. Multiphase signals 203A-X correspond to multiphase input 109B of FIG. 1, which receives multiphase signals phase signals 101A-N and 102A-N. The rising edge slew rate control signal 109C is output on slew rate control signal output 210. In falling edge slew rate control module 110, the input signal 201 is one of adjusted signals 107A-B of FIG. 1. Reference voltage 202 is the low power rail voltage, which may be 10% of the supply rail of the system 100 in some embodiments. Multiphase signals 203A-X correspond to multiphase input 111B of FIG. 1, which receives multiphase signals phase signals 101A-N and 102A-N. The falling edge slew rate control signal 111C is output on slew rate control signal output 210.

The slew rate control module 200 includes a bank of sense amplifier latches 204A-X that sample the input signal 201 with respect to the reference voltage 202; pulse generators 205A-X that each produce a pulse based on the sampled values; flip-flops 206A-X that store the outputs of the pulse generators 205A-X as a sampling vector; and finite state machine (FSM) 208 that evaluates the sampling vector stored in the flip-flops 206A-X and generates the slew rate control signal at output 210 based on a look-up table. The number X of sense amplifier latches, pulse generators, and flip-flops is equal to two times the number N of even and odd multiphase signals 101A-N and 102A-N, i.e., each of the input phase signals 101A-N and 102A-N of FIG. 1 has a respective sampling module including a sense amplifier latch, pulse generator, and flip-flop. The slew rate control FSM 208 generates a reset signal 207 that resets the flip-flops 206A-X. The reset signal 207 is generated based on a system clock input 209. Each time the reset signal 207 is received by the flip-flops 206A-X, a new sampling vector is generated in flip-flops 206A-X, and the slew rate control signal 210 may be adjusted by the FSM 208 based on the sampling vector. The input clock 209 has a frequency that is less than or equal to the frequency of multiphase inputs 203A-X, and reset signal 207 may have a frequency that is less that or equal to input clock 209.

Each sense amplifier latch 204A-X is driven by a different multiphase input 203A-X. The input signal 201 is connected to the positive data input of each sense amplifier latch 204A-X, and the reference voltage 202 is connected to the negative data input of each sense amplifier latch 204A-X. Multiphase inputs 203A-X control the sampling performed by the sense amplifier latches 204A-X. During a time period indicated by a sense amplifier latch's respective multiphase signal 203A-X, the sense amplifier latch 204A-X samples the relationship between the input signal 201 and the reference voltage 202. The sense amplifier latches 204A-X are clocked comparators that need additional circuitry to store the samples taken by the sense amplifier latches 204A-X, i.e., the pulse generators 205A-X and flip-flops 206A-X. When a logical '1' has been sampled by a sense amplifier latch 204A-X, the associated pulse generator 205A-X produces a pulse based on the 0-to-1 transition occurring at the output of the sense amplifier latch 204A-X, and the pulse is stored in the pulse generator's respective flip-flop 206A-X. The pulse generators 205A-X may be AND gates where one of the inputs is inverted and delayed with respect to the other in some embodiments. Since the multiphase inputs 203A-X are provided by a multiphase generator with monotonically increasing phases and equidistant phase shifts, the sampling vector stored in flip-flops 206A-X represents a time slicing of the input signal 201 as compared to the reference voltage 202 in the voltage domain. For instance, if the reference voltage 202 is 90% of the supply rail, a logical '1' in flip-flop 206A means that the input signal 201 is larger than the reference voltage 202 during the sampling time given by multiphase input 203A.

The sampling vector in the flip-flops 206A-X may include of a number of consecutive 1s and a number of consecutive 0s. Depending on the phase relationship between the multiphase signals 203A-X and the input signal 201, a 0-to-1 or 1-to-0 transition within the sampling vector may occur at different positions over successive sampling vectors. However, the slew rate control FSM 208 generates the slew rate control signal 210 based on the number of 0s relative to the number of 1s in the sampling vector, so that the position of the transition is not important. An example of a lookup table that may be used to generate the slew rate control signal 210 by a FSM 208 in a rising edge slew rate control module 108 having eight multiphase signal inputs is shown below in Table 1. The example lookup table in Table 1 has a hold point set at one '1' being present in the sampling vector. This hold point corresponds to the target rising edge slew rate, and may be set at any appropriate number of 1s and 0s in the sampling vector in various embodiments.

TABLE 1 slew rate control of rising edge

| Number of 1s | Pull-up Control Vector |
| --- | --- |
| 0 | Increase (i.e., increase pull-up drive strength) |
| 1 | Hold |
| 2 | Decrease (i.e., decrease pull-up drive strength) |
| 3 | Decrease |
| 4 | Decrease |
| 5 | Decrease |
| 6 | Decrease |
| 7 | Decrease |
| 8 | Decrease |

An example of a lookup table that may be used to generate the slew rate control signal 210 by a FSM 208 in a falling edge slew rate control module 110 that has eight multiphase signal inputs is shown below in Table 2. The example lookup table in Table 2 has a hold point set at one '0' being present in the sampling vector. This hold point corresponds to the target falling edge slew rate, and may be set at any appropriate number of 1s and 0s in the sampling vector in various embodiments.

TABLE 2 slew rate control of falling edge

| Number of 0s | Pull-down Control Vector |
|---|---|
| 0 | Increase (i.e., increase pull-down drive strength) |
| 1 | Hold |
| 2 | Decrease (i.e., decrease pull-down drive strength) |
| 3 | Decrease |
| 4 | Decrease |
| 5 | Decrease |
| 6 | Decrease |
| 7 | Decrease |
| 8 | Decrease |

Tables 1 and 2 are shown for illustrative purposes only. The number of entries in a lookup table in an FSM 208 corresponds to the number X of multiphase input signals, sense amplifier latches, pulse generators, and flip-flops in the slew rate control module 200 in which the FSM 208 is located.

Figure 3A:
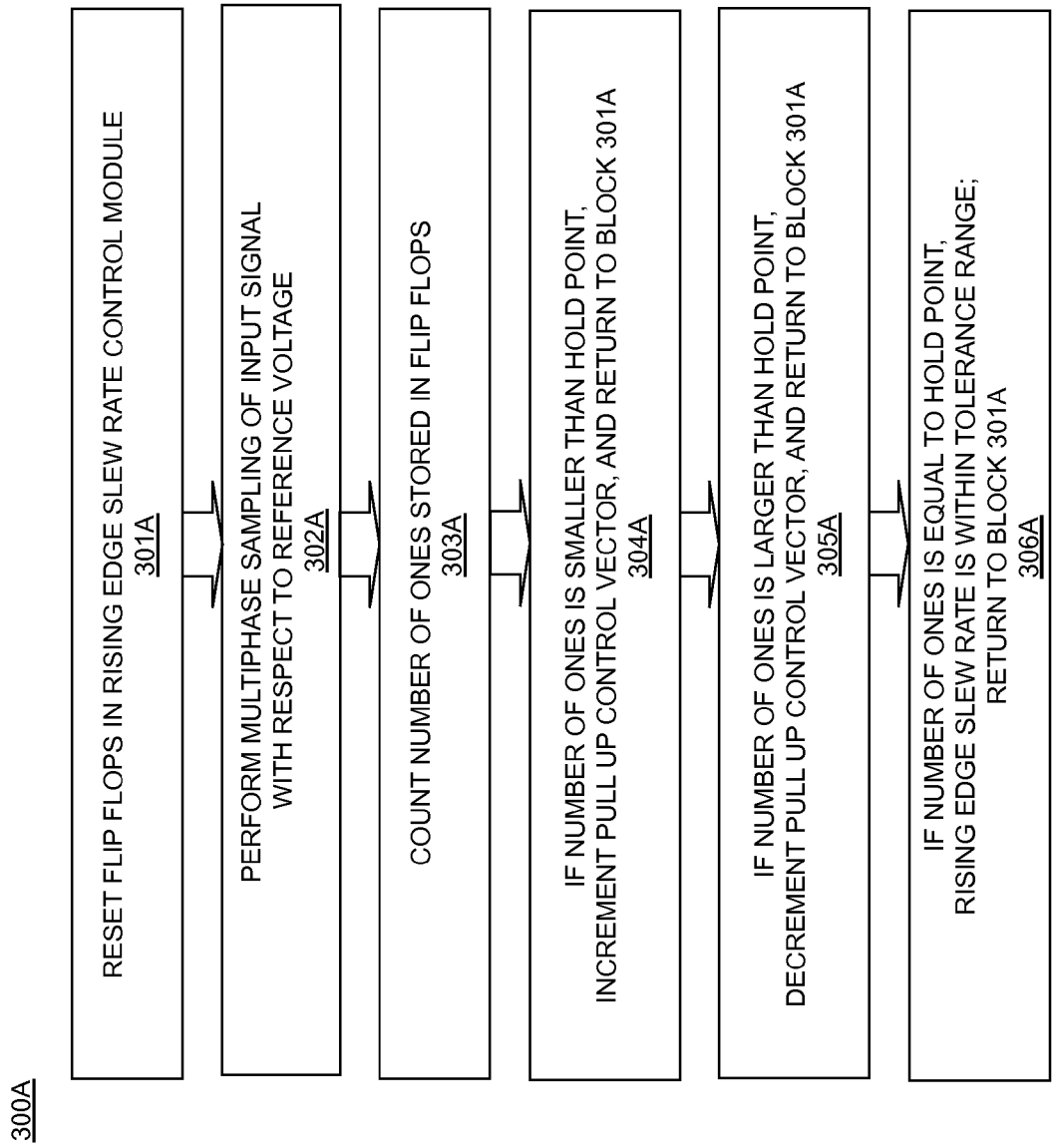
FIGS. 3A-B are flowcharts illustrating methods of falling and rising edge slew rate control.

FIG. 3A is a flowchart showing embodiments of a method 300A that may be implemented in rising edge slew rate control module 108 of FIG. 1. FIG. 3A is discussed with reference to FIGS. 1-2. In block 301A, the flip-flops 206A-X are reset by reset signal 207 from FSM 208. Then in block 302A, multiphase sampling of the signal 201 as compared to reference voltage 202 is performed. This is done in the sense amplifier latches 204A-X based on the respective multiphase inputs 203A-X. The sense amplifier latches 204A-X cause the pulse generators 205A-X to generate a pulse based on the respective samples; the pulse is stored in the respective flip-flops 106A-X. The output of the pulse generators 205A-X drives the clock input of the flip-flops 206A-X. The data input of the flip-flops 206A-X is connected to a logical '1'. Whenever a pulse generator 205A-X produces a pulse, the logical '1' at the data input of the associated flip-flop 206A-X is latched and appears at the output of the flip-flop 206A-X. Due to the periodic reset signal 207, this procedure of latching a logical '1' is periodically repeated and updates the sampling vector stored in flip-flops 206A-X in the event the associated sense amplifier latch 204A-X does not sample a logical '1' (for instance, in the case of rising edge sampling, if the input signal 201 to the sense amplifier latch 204A-X is below the reference signal 202) and hence no pulse is generated by the pulse generator 205A-X. In such a situation, the previous logical '1' in the sampling vector changes to a logical '0' owing to the periodic reset signal 207 and the missing pulse from the pulse generator 205A-X. In block 303A, the slew rate control FSM 208 counts the number of 1s and 0s stored in the flip-flops 206A-X. Then, in blocks 304A, 305A, and 306A, the FSM 208 uses a lookup table to generate a slew rate control signal 210, which controls the edge slewing stage 106 in the phase rotator 103. If, in block 304A, it is determined that the number of 1s stored in flip-flops 206A-X is less than the hold point, the slew rate control signal 210 indicates that the pull-up control vector of edge slewing stage 106 should be incremented, and flow returns to block 301A. Otherwise, if in block 305A it is determined that the number of 1s stored in flip-flops 206A-X is greater than the hold point, the slew rate control signal 210 indicates that the pull-up control vector of edge slewing stage 106 should be decremented, and flow returns to block 301A. Lastly, if the number of 1s is determined to be equal to the hold point in block 306A, the rising edge slew rate is within the tolerance range, so control signal 210 indicates that the current rising edge slew rate of edge slewing stage 106 should be held, and flow returns to block 301A.

Figure 3B:
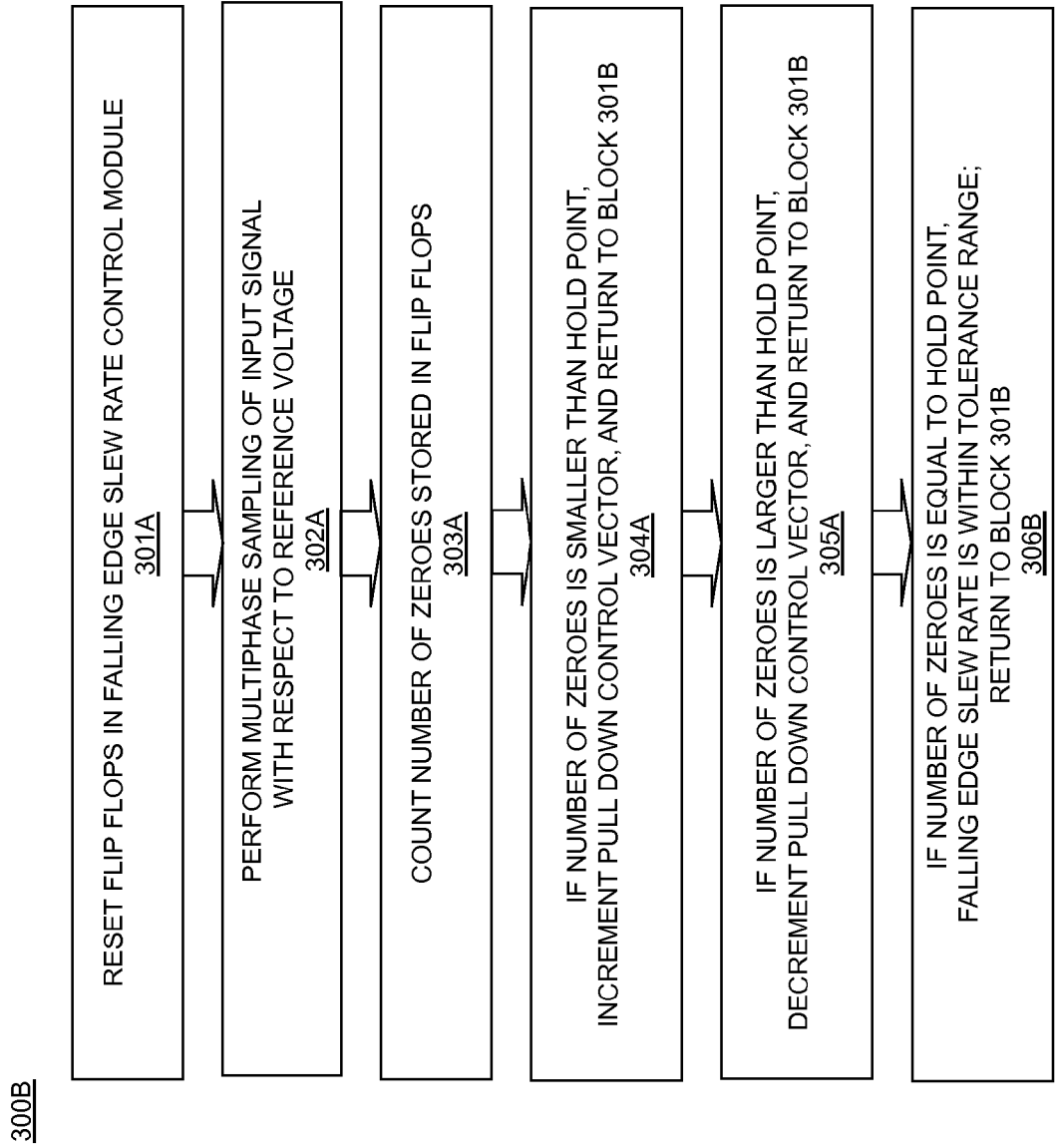

FIG. 3B is a flowchart showing embodiments of a methods 300B that may be implemented in a falling edge slew rate control module 110 of FIG. 1. FIG. 3A is discussed with reference to FIGS. 1-2. In block 301B, the flip-flops 206A-X are reset by reset signal 207 from FSM 208. Then in block 302B, multiphase sampling of the signal 201 as compared to reference voltage 202 is performed. This is done in the sense amplifier latches 204A-X based on the respective multiphase inputs 203A-X. The sense amplifier latches 204A-X cause the pulse generators 205A-X to generate a pulse based on the respective samples; the pulse is stored in the respective flip-flops 106A-X, as was described above with respect to block 302A of FIG. 3A. Then, in block 303B, the slew rate control FSM 208 counts the number of 1s and 0s stored in the flip-flops 206A-X. Then, in blocks 304B, 305B, and 306B, FSM 208 uses a lookup table to generate a slew rate control signal 210, which controls the edge slewing stage 106 in the phase rotator 103. If, in block 304B, it is determined that the number of 0s stored in flip-flops 206A-X is less than the hold point, the slew rate control signal 210 indicates that the pull-down control vector of edge slewing stage 106 should be incremented, and flow returns to block 301B. Otherwise, if in block 305B it is determined that the number of 0s stored in flip-flops 206A-X is greater than the hold point, the slew rate control signal 210 indicates that the pull-down control vector of edge slewing stage 106 should be decremented, and flow returns to block 301B. Lastly, if the number of 0s is determined to be equal to the hold point in block 306B, the falling edge slew rate is within the tolerance range, so control signal 210 indicates that the current falling edge slew rate of edge slewing stage 106 should be held, and flow returns to block 301B.

Figure 4:
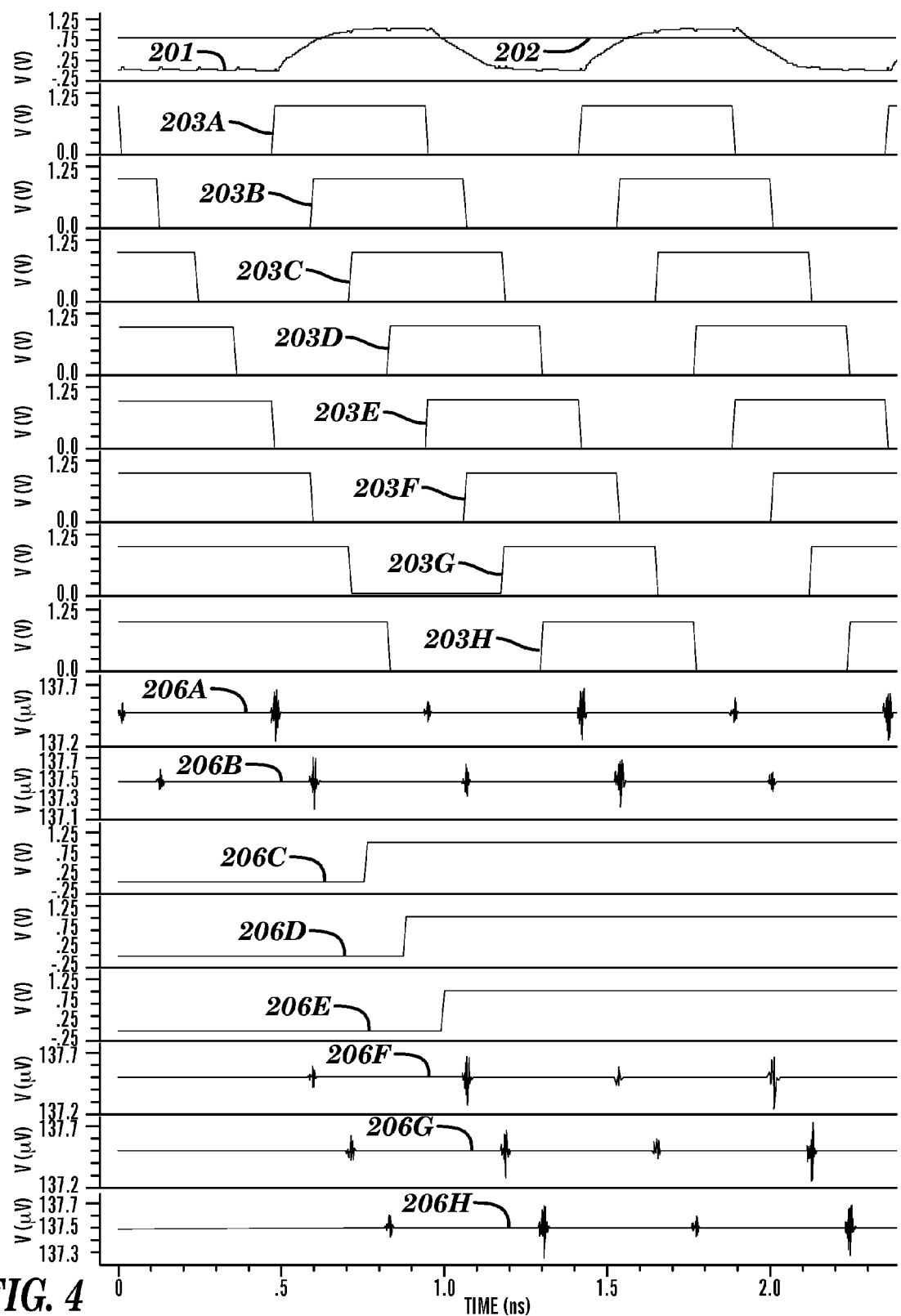
FIG. 4 is a graph illustrating an example of multiphase sampling for closed-loop multiphase slew rate control.

FIG. 4 is a graph illustrating an example of multiphase sampling for closed-loop multiphase slew rate control. FIG. 4 is discussed with reference to FIGS. 1-2. FIG. 4 shows signals that are generated in a rising edge slew rate control module 108. An example signal 201 and reference voltage 202 are shown in the top graph. The input signal 201 is even adjusted signal 107A that is received on input 109A in FIG. 1, and reference voltage 202 is the high power rail voltage. Multiphase inputs 203A-H generate respective flip-flop output values 206A-H based on whether input signal 201 is at the sampling point of time higher or lower than reference voltage 202. The sampling vector has eight entries in the example of FIG. 4, as there are eight multiphase inputs 203A-H. As shown in FIG. 4, at time t=2.0 nanoseconds, flip-flop outputs 206A, 206B, 206F, 206G, and 206H hold a value of 0, and flip-flop outputs 206C, 206D, and 206E hold a value of 1. Therefore, the FSM 208 would determine whether to raise, lower, or hold the pull-up drive strength in the edge slewing stage 106 based on whether three 1s in the sampling vector is lower, higher, or the same as the hold point defined in the look-up table. The reset signal 207 is not shown in the graph of FIG. 4.

Figure 5:
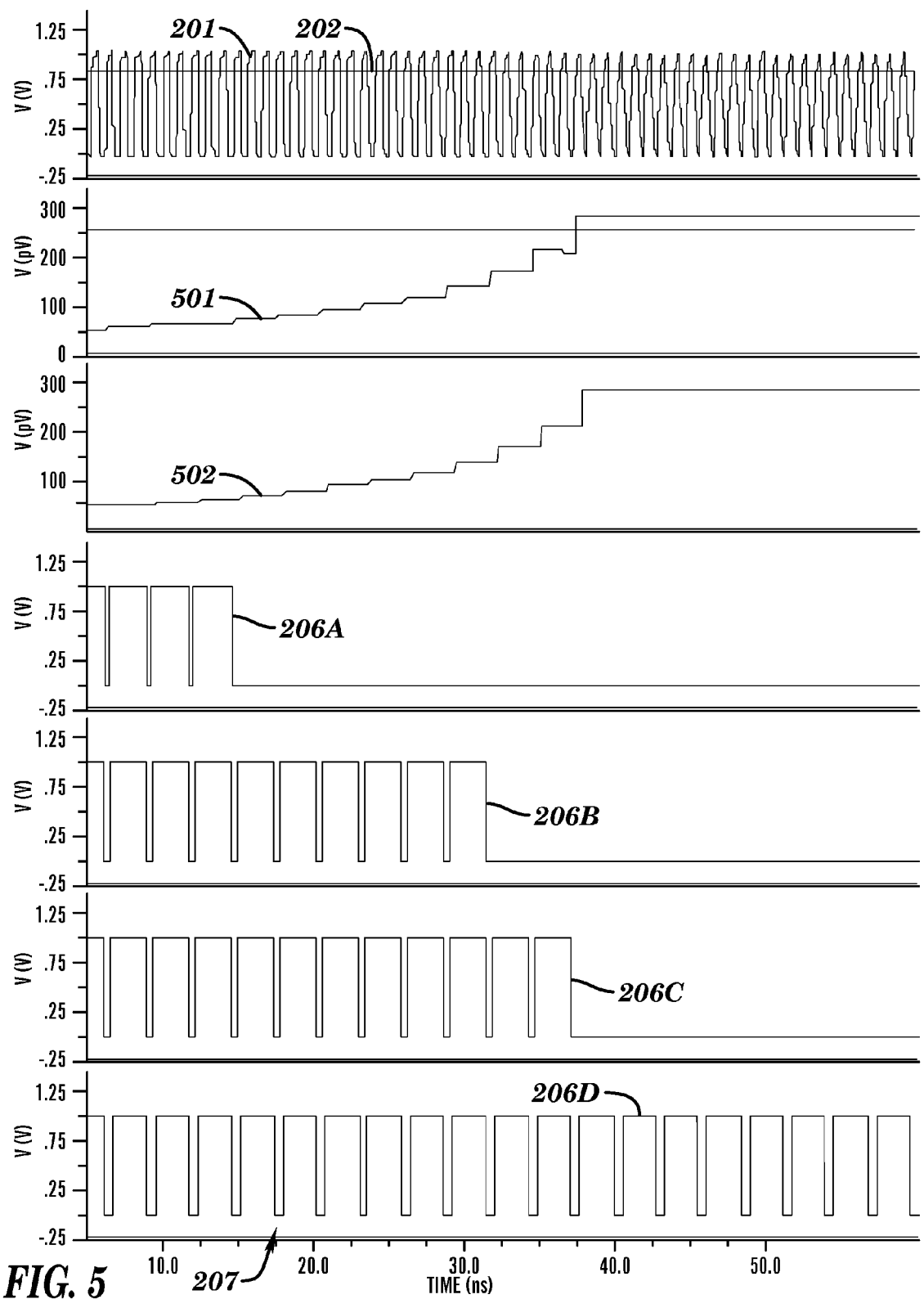
FIG. 5 is a graph illustrating an example simulation of closed-loop multiphase slew rate control.

FIG. 5 is a graph illustrating a simulation of closed-loop multiphase slew rate control. FIG. 5 is discussed with reference to FIGS. 1-2. FIG. 5 shows signals that are generated in a rising edge slew rate control module 108. An example input signal 201 and reference voltage 202 are shown in the top graph. The input signal 201 is even adjusted signal 107A that is received on input 109A in FIG. 1, and reference voltage 202 is the high power rail voltage. In this example, the rising edge slew rate of example signal 201 starts with at a relatively fast setting, and is reduced over time by rising edge slew rate control module 108. Signal 501 shows the 10% to 90% rise time of input signal 201, and signal 502 shows the 10% to 90% fall time of input signal 201. Each time a reset signal (such as at reset 207) is received by the flip-flops 206A-D from FSM 208, a new sampling vector is generated in the flip-flops 206A-D. The FSM 208 determines the number of is in the set of flip-flop values 206A-D. The lookup table is then used by FSM 208 to generate a rising edge slew rate control signal that adjusts the pull up control vector of the edge slewing stage 106, and the rising edge slew rate of input signal 201, until the hold point is reached. In the example of FIG. 5, one '1' in the set of flip-flop values 206A-D is the hold point, so as time t increases, the rising edge slew rate is decreased after each reset 207 until flip-flop value 206D holds a value of '1' and flip-flop value 206A-C each hold a value of '0', at which point the hold point it reached and the rising edge slew rate of input signal 201 is maintained. In the embodiment of FIG. 5 only the rising edge is measured, and the rising and falling edge slew rate are both adjusted based on this measurement by adjusting the pull-up and pull-down control vectors simultaneously. In such an embodiment, the process variations must affect the pull-up (PFET) and the pull-down (NFET) branches in the same way. If this is not the case and p/n mismatch occurs, the slew rate measurements must be performed and applied separately to the rising and falling edges.

Figure 6:
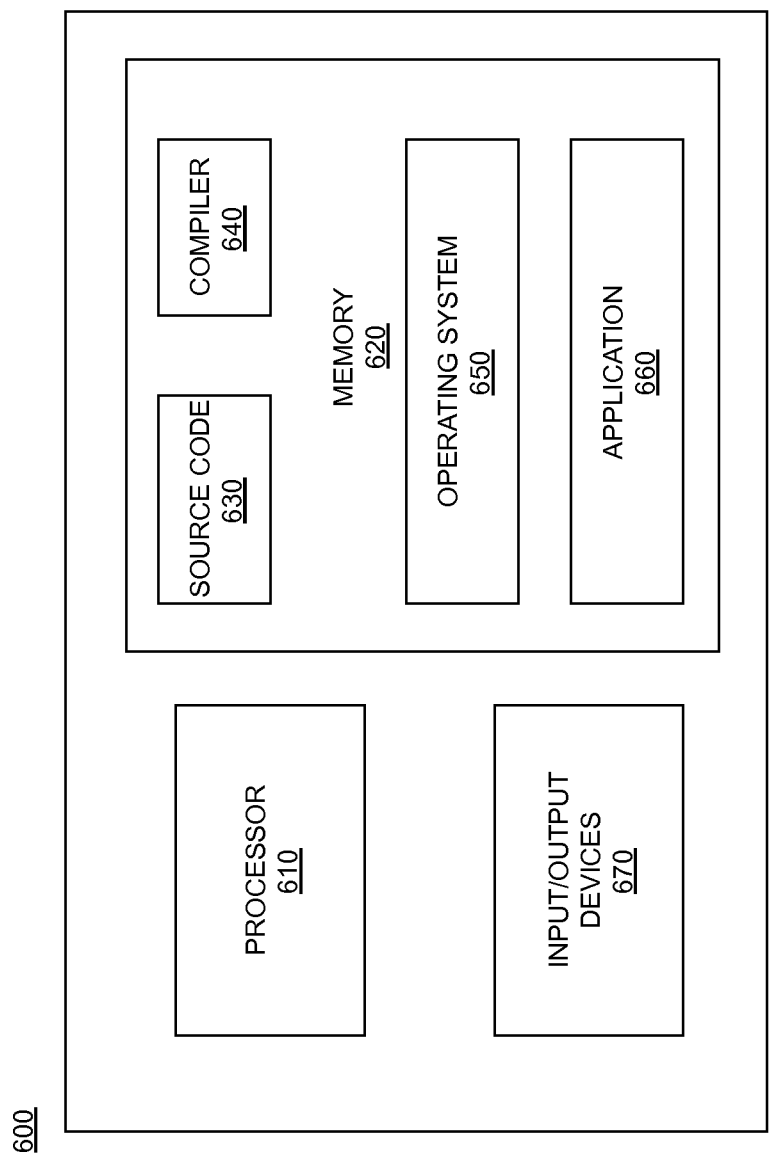
FIG. 6 is a schematic block diagram illustrating an embodiment of a computer that may be used in conjunction with a closed-loop multiphase slew rate controller.

FIG. 6 illustrates an example of a computer 600 which may be utilized in conjunction with a closed-loop multiphase slew rate controller. Various operations discussed above may utilize the capabilities of the computer 600. One or more of the capabilities of the computer 600 may be incorporated in any element, module, application, and/or component discussed herein.

The computer 600 includes, but is not limited to, PCs, workstations, laptops, PDAs, palm devices, servers, storages, and the like. Generally, in terms of hardware architecture, the computer 600 may include one or more processors 610, memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a digital signal processor (DSP), or an auxiliary processor among several processors associated with the computer 600, and the processor 610 may be a semiconductor based microprocessor (in the form of a microchip) or a macroprocessor.

The memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. The software in the memory 620 includes a suitable operating system (O/S) 650, compiler 640, source code 630, and one or more applications 660 in accordance with exemplary embodiments. As illustrated, the application 660 comprises numerous functional components for implementing the features and operations of the exemplary embodiments. The application 660 of the computer 600 may represent various applications, computational units, logic, functional units, processes, operations, virtual entities, and/or modules in accordance with exemplary embodiments, but the application 660 is not meant to be a limitation.

The operating system 650 controls the execution of other computer programs, and provides scheduling, input-output control, file and data management, memory management, and communication control and related services. It is contemplated by the inventors that the application 660 for implementing exemplary embodiments may be applicable on all commercially available operating systems.

Application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 670 may include input devices such as, for example but not limited to, a mouse, keyboard, scanner, microphone, camera, etc. Furthermore, the I/O devices 670 may also include output devices, for example but not limited to a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or intranet.

If the computer 600 is a PC, workstation, intelligent device or the like, the software in the memory 620 may further include a basic input output system (BIOS) (omitted for simplicity). The BIOS is a set of essential software routines that initialize and test hardware at startup, start the O/S 650, and support the transfer of data among the hardware devices. The BIOS is stored in some type of read-only-memory, such as ROM, PROM, EPROM, EEPROM or the like, so that the BIOS can be executed when the computer 600 is activated.

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include a scalable, easily reconfigurable, and relatively high-speed digital slew controller.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A slew rate controller for a computing system, comprising:
   a slew rate control module, the slew rate control module further comprising;
      a plurality of sampling modules, each sampling module corresponding to one of a plurality of phase signal inputs, wherein each sampling module receives an input signal, a reference voltage, and the sampling module's respective phase signal input, and wherein each sampling module generates a respective sample of a relationship between the input signal and the reference voltage during a time period indicated by the sampling module's respective phase signal input; and
      a finite state machine configured to output a slew rate control signal to control a slew rate of the input signal based on the plurality of samples from the sampling modules;
   wherein each sampling module comprises:
      a sense amplifier latch, wherein the sense amplifier latch receives the input signal, the reference voltage, and the sampling module's respective phase signal input, and wherein the sense amplifier latch generates the sample;
      a pulse generator connected to the sense amplifier latch, wherein the pulse generator configured to generate a pulse based on the sample; and
      a flip-flop, the flip-flop being configured to store the pulse from the pulse generator for examination by the finite state machine.

2. The slew rate controller of claim 1, wherein the finite state machine is configured to reset the plurality of flip-flops in the plurality of sampling modules based on a clock signal.

3. The slew rate controller of claim 1, further comprising a rising edge slew rate control module and a falling edge slew rate control module.

4. The slew rate controller of claim 3, wherein the slew rate control module comprises the rising edge slew rate control module, and wherein the reference voltage comprises a high power rail voltage.

5. The slew rate control module of claim 4, wherein the finite state machine comprises a lookup table, and controls the slew rate of the input signal based on the plurality of samples from the sampling modules by determining whether a number of logical 1s and 0s in the plurality of samples indicates raising a rising edge slew rate of the input signal, lowering a rising edge slew rate of the input signal, or holding the rising edge slew rate of the input signal based on the lookup table.

6. The slew rate controller of claim 3, wherein the slew rate control module comprises a falling edge slew rate control module, and wherein the reference voltage comprises a low power rail voltage.

7. The slew rate control module of claim 6, wherein the finite state machine comprises a lookup table, and controls the slew rate of the input signal based on the plurality of samples from the sampling modules by determining whether a number of logical 1s and 0s in the plurality of samples indicates raising a falling edge slew rate of the input signal, lowering a falling edge slew rate of the input signal, or holding the falling edge slew rate of the input signal based on the lookup table.

8. The slew rate controller of claim 1, wherein the input signal is received from an output of a edge slewing stage of a phase rotator, and wherein the finite state machine outputs the slew rate control signal to an input of the edge slewing stage.

9. The slew rate controller of claim 8, wherein the slew rate controller outputs the slew rate control signal to inputs of a plurality of edge slewing stages in a plurality of phase rotators in the computing system.

10. The slew rate control module of claim 8, wherein the plurality of phase signal inputs are inputs to the edge slewing stage of the phase rotator, and are used by the edge slewing stage to generate the input signal.

11. A method for slew rate control in a computing system, comprising:
receiving, by a slew rate control module, an input signal, a reference voltage, and a plurality of phase signal inputs, wherein the slew rate control module comprises a plurality of sampling modules, each sampling module corresponding to a phase signal input of the plurality of phase signal inputs, wherein each sampling module receives the input signal, the reference voltage, and the sampling module's respective phase signal input;
generating, by each of the plurality of sampling modules, a sample of a relationship between the input signal and the reference voltage during a time period indicated by the sampling module's respective phase signal input; and
outputting, by a finite state machine of the slew rate control module, a slew rate control signal to control a slew rate of the input signal based on the plurality of samples from the sampling modules;
wherein the slew rate control module comprises a rising edge slew rate control module, the reference voltage comprises a high power rail voltage, and further comprising:
determining whether a number of 1s and 0s in the plurality of samples by the finite state machine;
determining from a look-up table whether the number of 1s and 0s indicates raising a rising edge slew rate of the input signal, lowering a rising edge slew rate of the input signal, or holding the rising edge slew rate of the input signal; and
generating the slew rate control si nal b the finite state machine based on the look-up table.

12. The method of claim 11, wherein a sampling module comprises a sense amplifier latch, a pulse generator connected to the latch, and a flip-flop connected to the pulse generator, and wherein generating, by each of the plurality of sampling modules, a sample of the relationship between the input signal and the reference voltage during a time period indicated by the sampling module's respective phase signal input comprises:
receiving the input signal, the reference voltage, and the sampling module's respective phase signal input by the sense amplifier latch;
generating the sample of the relationship between the input signal and the reference voltage during a time period indicated by the sampling module's respective phase signal input by the sense amplifier latch;
generating a pulse based on the sample by the pulse generator; and
storing the pulse from the pulse generator in the flip-flop for examination by the finite state machine.

13. The method of claim 12, further comprising resetting the plurality of flip-flops in the plurality of sampling modules by the finite state machine based on a clock signal.

14. The method of claim 11, wherein the input signal is received from an output of a edge slewing stage of a phase rotator, and wherein the finite state machine outputs the slew rate control signal to an input of the edge slewing stage.

15. The method of claim 14, further comprising outputting the slew rate control signal to inputs of a plurality of edge slewing stages in a plurality of phase rotators in the computing system.

16. A slew rate controller for a computing system, comprising:
a slew rate control module, the slew rate control module further comprising:
a plurality of sampling modules, each sampling module corresponding to one of a plurality of phase signal inputs, wherein each sampling module receives an input signal, a reference voltage, and the sampling module's respective phase signal input, and wherein each sampling module generates a respective sample of a relationship between the input signal and the reference voltage during a time period indicated by the sampling module's respective phase signal input; and
a finite state machine configured to output a slew rate control signal to control a slew rate of the input signal based on the plurality of samples from the sampling modules; and
further comprising a rising edge slew rate control module and a falling edge slew rate control module, wherein the slew rate control module comprises the rising edge slew rate control module, wherein the reference voltage comprises a high power rail voltage, and wherein the finite state machine comprises a lookup table, and controls the slew rate of the input signal based on the plurality of samples from the sampling modules by determining whether a number of logical 1s and 0s in the plurality of samples indicates raising a rising edge slew rate of the input signal, lowering a rising edge slew rate of the input signal, or holding the rising edge slew rate of the input signal based on the lookup table.

17. A slew rate controller for a computing system, comprising:
a slew rate control module, the slew rate control module further comprising:
a plurality of sampling modules, each sampling module corresponding to one of a plurality of phase signal inputs, wherein each sampling module receives an input signal, a reference voltage, and the sampling module's respective phase signal input, and wherein each sampling module generates a respective sample of a relationship between the input signal and the reference voltage during a time period indicated by the sampling module's respective phase signal input; and
a finite state machine configured to output a slew rate control signal to control a slew rate of the input signal based on the plurality of samples from the sampling modules;
wherein the slew rate control module comprises a falling edge slew rate control module, wherein the reference voltage comprises a low power rail voltage, and wherein the finite state machine comprises a lookup table, and controls the slew rate of the input signal based on the plurality of samples from the sampling modules by determining whether a number of logical 1s and 0s in the plurality of samples indicates raising a falling edge slew rate of the input signal, lowering a falling edge slew rate of the input signal, or holding the falling edge slew rate of the input signal based on the lookup table.

18. A method for slew rate control in a computing system, comprising:

receiving, by a slew rate control module, an input signal, a reference voltage, and a plurality of phase signal inputs, wherein the slew rate control module comprises a plurality of sampling modules, each sampling module corresponding to a phase signal input of the plurality of phase signal inputs, wherein each sampling module receives the input signal, the reference voltage, and the sampling module's respective phase signal input;

generating, by each of the plurality of sampling modules, a sample of a relationship between the input signal and the reference voltage during a time period indicated by the sampling module's respective phase signal input; and outputting, by a finite state machine of the slew rate control module, a slew rate control signal to control a slew rate of the input signal based on the plurality of samples from the sampling modules;

wherein the slew rate control module comprises a falling edge slew rate control module, the reference voltage comprises a low power rail voltage, and further comprising:

determining whether a number of 1s and 0s in the plurality of samples by the finite state machine;

determining from a look-up table whether the number of 1s and 0s indicates raising a falling edge slew rate of the input signal, lowering a falling edge slew rate of the input signal, or holding the falling edge slew rate of the input signal; and generating the slew rate control signal by the finite state machine based on the look-up table.

\* \* \* \* \*